C. NUHRING.
HOSE RACK.
APPLICATION FILED JAN. 6, 1910.
1,056,208.
Patented Mar. 18, 1913.
3 SHEETS—SHEET 1.
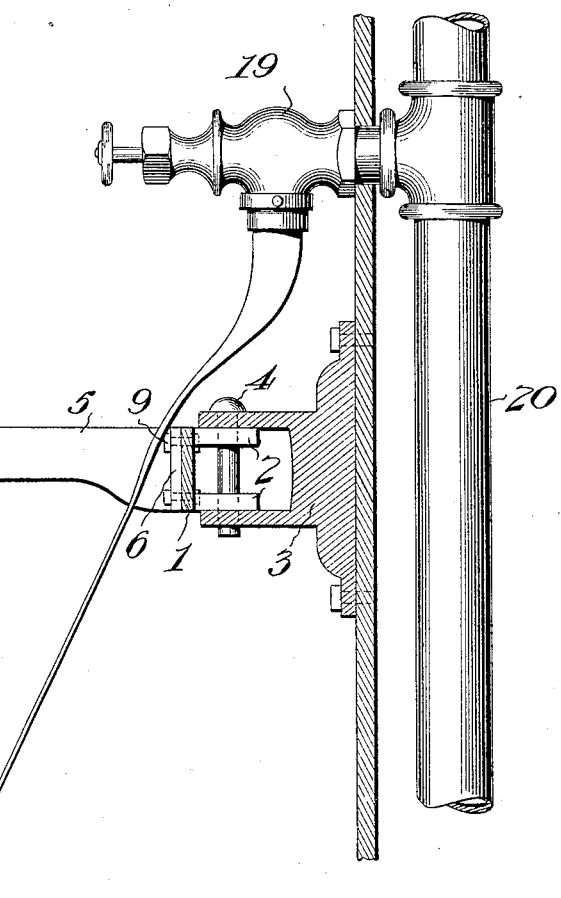
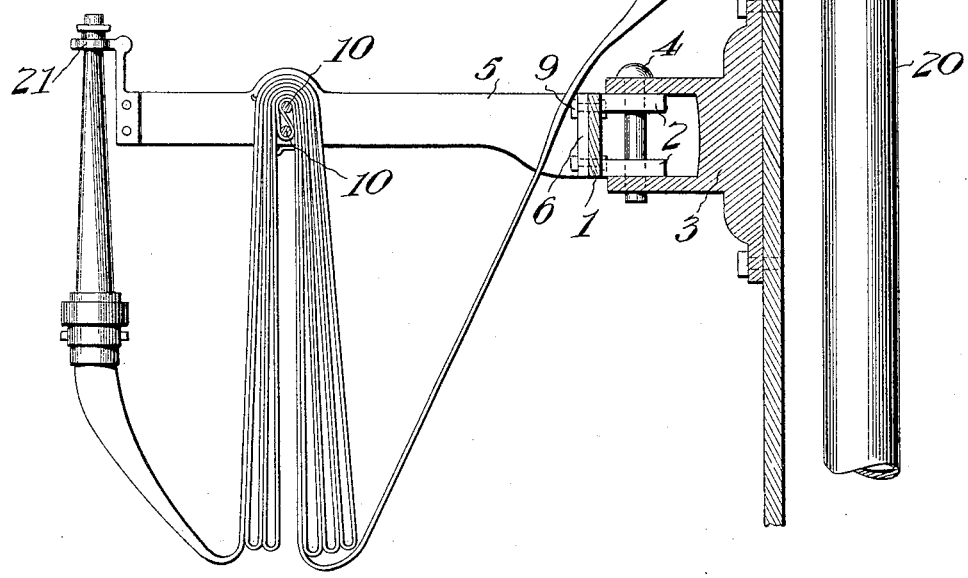
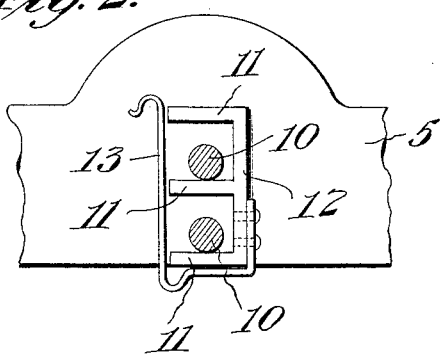

C. NUHRING.
HOSE RACK.
APPLICATION FILED JAN. 6, 1910.
1,056,208.
Patented Mar. 18, 1913.
3 SHEETS—SHEET 2.
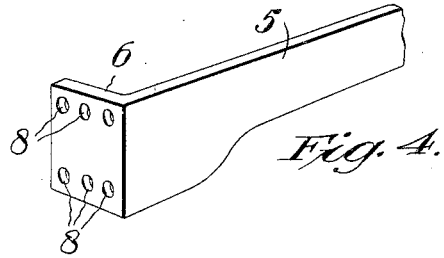
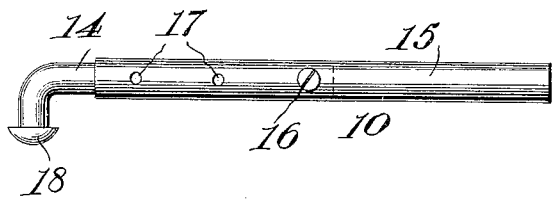
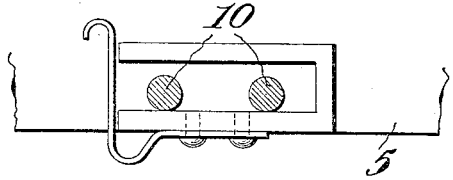
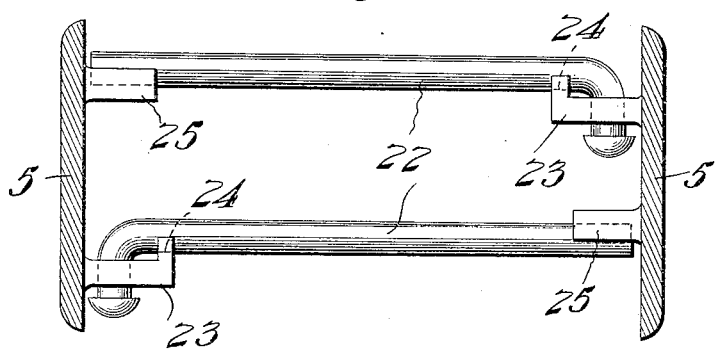
Witnesses
Inventor
Charles Nuhring
By
Attorney

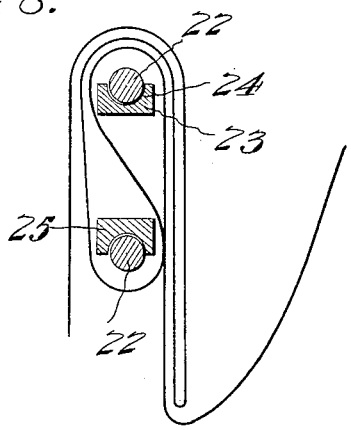
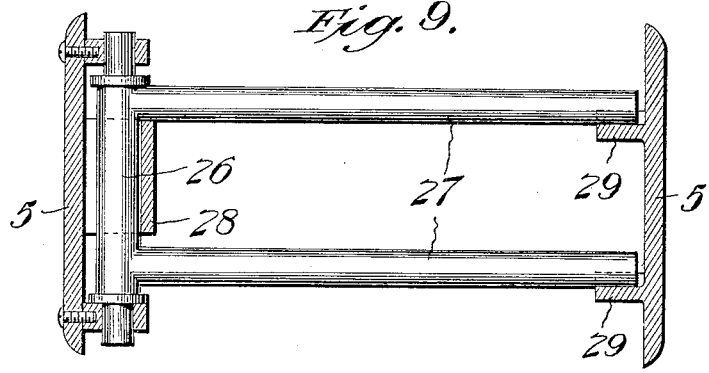
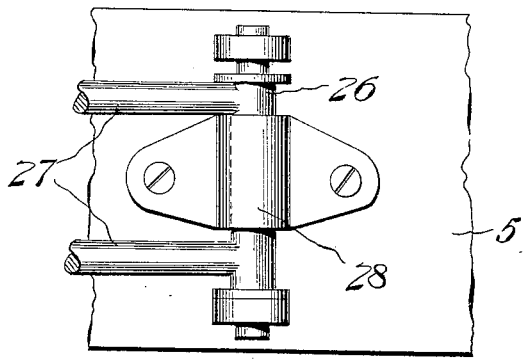

UNITED STATES PATENT OFFICE.

CHARLES NUHRING, OF CINCINNATI, OHIO.

HOSE-RACK.

1,056,208.

Specification of Letters Patent. Patented Mar. 18, 1913.

Application filed January 6, 1910. Serial No. 536,723.

*To all whom it may concern:*

Be it known that I, CHARLES NUHRING, a citizen of the United States, residing at Cincinnati, in the county of Hamilton and State of Ohio, have invented certain new and useful Improvements in Hose-Racks; and I do hereby declare the following to be a full, clear, and exact description of the invention, such as will enable others skilled in the art to which it appertains to make and use the same.

This invention relates to improvements in racks for supporting hose.

Many forms of hose-supporting racks have been devised, and repeated effort has been made to produce a rack which, while effectually supporting the hose, may be operated expeditiously and with ease. The majority of the prior racks, however, are open to the objection that it is first necessary to remove or displace the hose therefrom before turning on the water, thus requiring the operator to return to the water valve, after the hose has been laid, in order to start the flow. Not only does this involve a loss of time in starting the play of the water upon the fire, but after the hose is under pressure, and retention of the nozzle has left the operator, it is with difficulty that the nozzle of the hose is regained. Furthermore, the majority of hose racks which have preceded the present invention require more or less skill in their operation, so that to a person not possessing the requisite knowledge or skill, much difficulty is experienced in racking and unracking the hose.

It is, therefore, the object of the present invention to provide a hose rack which is so constructed as to overcome the objection referred to, the rack embodying means whereby the water or other extinguishing agent first may be turned on without removing the hose from the rack, the water, however, being permitted not to flow through the hose until the latter has been entirely removed from the rack, or until the full length of the hose has been laid and the operator is in position with the nozzle to play upon the fire.

A further object of the present invention is to provide a rack the construction and mode of operation of which are so simple that unskilled persons will experience no difficulty in removing the hose from the rack or replacing the hose thereon after use.

With these general objects in view, and others which will appear as the nature of the improvements is better understood, the invention consists substantially in the novel construction, combination and arrangement of parts hereinafter fully described, illustrated in the accompanying drawings, and pointed out in the appended claims.

In the drawings: Figure 1 is a longitudinal sectional view of a hose rack constructed in accordance with the present invention. Fig. 2 is a fragmentary elevation illustrating in section the supporting members and the locking means therefor on an enlarged scale. Fig. 3 is an end elevation of the head. Fig. 4 is a detail perspective view of one of the arms. Fig. 5 is a detail elevation illustrating one of the supporting members for the hose. Fig. 6 is a fragmentary elevation illustrating an alternative form of the supporting members. Fig. 7 is a transverse-sectional view illustrating another arrangement of the supporting members. Fig. 8 is a sectional elevation illustrating in diagram the arrangement of the supporting members illustrated in Fig. 6, and the manner in which the hose is looped thereon. Fig. 9 is also a transverse sectional view illustrating a further alternative form of the supporting members. Fig. 10 is a fragmentary elevation illustrating the manner of mounting the form of supporting members illustrated in Fig. 8.

Referring in detail to the drawings, the numeral 1 designates the head of the herein described hose rack, this head being provided with a pair of parallel perforated ears 2 which fit within a supporting bracket 3, the ears 2 being pivotally mounted in said bracket 3 through the medium of a pin or bolt 4, or its equivalent. By reason of this construction the bracket 3 constitutes the attaching means for applying the rack to a wall or other point of support.

Connected to the head 1 is a pair of parallel arms 5, each of which arms is provided, at the end immediately adjacent to the head 1, with an inwardly-extending web or flange 6. It will thus be seen that the arms 5 are substantially L-shaped, the webs or flanges 6 being provided for the purpose of attaching the arms to the head. That this may be accomplished the ends of the head 1 are provided with upper and lower perforations 7, and each of the webs or flanges 6 are provided with similar perforations 8. These perforations, however, are arranged in series, and any one of the perforations 8, at the top and bottom of the webs or flanges 6, may be brought into registry with the upper and lower perforations of the head 1, suitable bolts 9, or their equivalent, being provided to fit within the perforations 7 and 8, and thereby hold the head 1 and the arm 5 in joined relation. By providing a series of the perforations 8 at the tops and bottoms of the webs or flanges 6, the arms 5 may be moved toward or away from each other, thereby making provision for varying the width of the space between said arms 5, and thus adapting the rack for accommodating different diameters of hose.

It has been stated that the present invention contemplates a hose rack in which means are embodied whereby the water or other extinguishing agent first may be turned on without removing the hose from the rack, but which will not permit the water to flow through the hose until the latter is entirely removed from the rack. In accomplishing this end, it is proposed to use the supporting means for the hose as a locking means to close or kink the hose at a certain point in its length, and thus preclude passage of the water. This, therefore, imparts to said members a dual function, to wit: the supporting of the hose, and the locking of the latter in the manner stated, which locking will permit the water to be turned into the hose, but until the hose becomes entirely removed from the rack the water will remain in that portion extending from the water supply to the point where the kink or lock occurs. Thus the operator, upon the outbreaking of the fire, may first turn the water on before taking any steps whatever in displacing the hose from the rack, whereupon the nozzle of the hose may be seized and taken to the point of the fire, the hose being thus removed from the rack during such transit, and immediately upon the lock or kink being removed from its choking effect upon the hose, by reason of its displacement from the rack, the water rushes through the hose to the nozzle for delivery upon the fire.

The numeral 10 designates a plurality of supporting members, which are preferably in the form of pins. These supporting members span the space between the arms 5, and, in the form illustrated in Figs. 1 to 5 of the drawings, said members are arranged in superimposed relation. Two of these members are preferably employed, and the same are received by guides 11, in the form of inwardly projecting lugs arranged at the inner sides or faces of the arms 5, and spaced apart a sufficient distance to receive the supporting members 10. The spaces between the guides 11 are closed at one end by a vertical web 12, and when these members 10 are in the form of pins, each of the guides 11 is closed by a retaining spring 13 which projects across the spaces between the guides. These springs are merely of such tension as to hold the supporting members 10 within the guides, but are not sufficiently strong to prevent removal of the supporting members from the guides when nominal pressure is exerted thereon. In other words, the springs 13 are of such elasticity as to readily yield under slight pressure exerted upon the supporting members 10, thereby permitting the latter to be easily removed from the guides in the displacement of the hose from the rack.

In order that the supporting members 10 may be adjusted in accordance with the adjustment of the arms 5, said supporting members are formed of telescopic sections. This is illustrated in Fig. 5, in which the numeral 14 designates the shank section, and 15 the barrel section, the latter receiving the shank section, and being held in adjusted position on the latter by means of a retaining screw 16, or its equivalent, which engages the shank section, and which may be fitted in any one of a plurality of openings 17 formed in the barrel section. When so adjusted, it is obvious that the supporting member may be increased or decreased in length, in accordance with the adjustment of the arms 5 in relation to each other.

If desired, the supporting members 10 may be pivoted to one of the arms 5, in which event each of said members would be provided with a head 18, as illustrated in Fig. 5, the lugs constituting the guides 10 of the arm to which the supporting members are pivoted being, in this instance, perforated for receiving the heads 18. Under these circumstances, only the opposite guides would be provided with the retaining spring 13, and, obviously, the supporting members would be swung into and out of engagement with the guides.

The numeral 19 designates a controlling valve on a water stand-pipe 20, or other supply for the extinguishing agent, and to this valve the hose is connected as is usual. In placing the hose upon the rack the same passes upwardly through the rack and is looped upon the upper supporting member 10, the hose being then passed between the upper member and the lower member 10, and being looped about the latter. After this has been done the hose is passed upwardly over its looped portion which has been passed around the upper member 10, and then passes downwardly to form a pendant loop. In the further racking of the hose the same is passed alternately backwardly and forwardly over the supporting members, thereby building up a series of pendant loops supported at their intermediate portions by the members 10, and obviously free to be removed with facility and ease. When the entire length of the hose has been thus placed upon the rack the nozzle is engaged with a suitable holder 21 carried by the arms 5, which holder sustains the nozzle in position to be conveniently grasped when it is desired to remove the hose from the rack. In looping the hose around the supporting members 10 in the manner described, it is manifest that the hose is kinked or locked at that point, thereby choking off the passage of the water until the hose has been displaced from the supporting members 10, and this does not occur, as previously indicated, until the whole length of the hose has been displaced from the rack.

The arrangement of the supporting members 10, and the means for holding the same upon the arms 5, may be varied, and instances of such variation are illustrated in Figs. 6 to 10, inclusive. By referring to Fig. 6 it will be observed that the construction disclosed therein is substantially the same as illustrated in Figs. 1 to 4, inclusive, the distinction being that the supporting members 10 in Fig. 6 are arranged in the same horizontal plane, in lieu of being superimposed, a single guide being sufficient for the purpose of sustaining the members 10 upon the arms 5, and in position to support the hose in the manner described.

In Fig. 7 is disclosed a further alternative arrangement, wherein the supporting members are designated by the numeral 22, each of which members is pivoted upon one of the arms 5, the free end of the member projecting to the opposite arm 5. The members 22 are each pivoted in supporting lugs 23 the upper side of which has a notch 24 for receiving the supporting member, and the free ends of said members engage notched lugs 25 which are carried by the arms 5. The lug 25 engaged by the lower supporting member 22 has its notch projected downwardly, while the corresponding lug which receives the upper member 22 has its notch projected upwardly, and each of the members 22 has sufficient vertical play at its pivotal point in the lugs 23 to permit free movement as the members 22 are passed into and removed from the notches of the respective lugs.

In the form of the supporting members illustrated in Figs. 9 and 10 the same are cast as a swinging bracket 26, the numeral 27 designating the supporting members, said bracket being mounted upon the arm 5 through the medium of a hinge-plate 28 which is riveted or otherwise suitably fastened to said arm. The free ends of the supporting members 27 rest upon lugs 29 carried by the opposite arm 5, which lugs may be notched, as illustrated in Figs. 6 and 7, for receiving said supporting members 27.

In using the herein described rack, the controlling valve 19 is first opened, whereupon the water enters that portion of the hose between said valve and the point where the hose is looped about the supporting members 10. At that point, the hose being kinked, and thereby choked against passage of the water, the water finds a barrier to its further progress through the hose. After the valve 19 has been opened, the operator grasps the nozzle of the hose, removing the same from the holder 21, and proceeds to the point where it is desired to discharge the water. At such time the loops of the hose successively leave the rack until the entire length of the hose between the nozzle and the supporting members 10 has been displaced, whereupon the pins 10 are successively removed from the guides 11, thus breaking the kink or lock in the hose, and opening the same to the passage of the water to the nozzle, which passage ensues, and the water discharges at the nozzle in the usual manner. When the hose has been emptied of the water, by closing the valve 19, and thereby cutting off the water supply, the same may be again looped upon the rack in the manner previously described, it being essential, however, to replace the supporting members 10 in the guides 11, in order to kink the hose at that point, and thus again establish the lock therein.

In the arrangement of the supporting members 27, illustrated in Figs. 9 and 10, the hose is removed simultaneously from both of these, while in the other forms it leaves the members successively, but the arrangement illustrated in Figs. 9 and 10 clearly acts to establish a kink or lock in the same manner as in the other forms.

Having thus described the invention, what is claimed as new, and desired to be secured by Letters Patent, is:

1. In a hose rack, a plurality of freely-movable members associated therewith and about which the hose is looped to choke the latter at a point intermediate the feed and discharge ends thereof, said members serving to support the hose upon the rack.

2. In a hose rack, a locking device for choking the hose at a point intermediate the feed and discharge ends thereof, whereby to preclude passage of the water through the length of the hose until the latter is removed from the rack, and means for holding said locking device against movement until pressure is applied thereto.

3. In a hose rack, a plurality of arms, and a plurality of members associated therewith and about which the hose is looped to choke the latter at a point intermediate the feed and discharge ends thereof, whereby to preclude passage of the water through the length of the hose until the latter is removed from the rack, said members normally spanning the space between said arms and serving to support the hose therebetween.

4. In a hose rack, a plurality of arms, a locking device normally spanning the space between said arms for choking the hose at a point intermediate the feed and discharge ends thereof, whereby to preclude passage of the water through the length of the hose until the latter is removed from the rack, and means for holding said locking device against movement until pressure is applied thereto.

5. In a hose rack, a plurality of arms, and a plurality of freely-movable supporting members associated therewith and normally spanning the space between said arms, said members coöperating with the hose to choke the latter at a point intermediate the feed and discharge ends thereof, whereby to preclude passage of the water through the length of the hose until the latter is removed from the rack.

6. In a hose rack, a plurality of arms, a plurality of supporting members associated therewith and normally spanning the space between said arms, said members coöperating with the hose to choke the latter at a point intermediate the feed and discharge ends thereof, whereby to preclude passage of the water through the length of the hose until the latter is removed from the rack, and means for holding said supporting members against movement until pressure is applied thereto.

7. In a hose rack, a plurality of arms, a plurality of members associated therewith and about which the hose is looped to choke the latter at a point intermediate the feed and discharge ends thereof, and devices associated with said arms for holding said members in choking relation to the hose.

8. In a hose rack, a plurality of arms, a plurality of members associated therewith and about which the hose is looped to choke the latter at a point intermediate the feed and discharge ends thereof, said members serving to support the hose upon the rack, devices associated with said arms for holding said members in choking relation to the hose, and means for locking said members against movement until pressure is applied to the hose.

9. In a hose rack, a plurality of arms, guides associated therewith, a plurality of freely-movable members associated with said guides and about which the hose is looped to choke the latter at a point intermediate the feed and discharge ends thereof, said members serving to support the hose upon the rack, and means for retaining said members in associated relation with the guides until pressure is applied to the hose.

10. In a hose rack, a support, and means associated therewith about which the hose is looped and acting to choke the hose to prevent passage of water therethrough until the hose is completely displaced from the rack, said means also serving to support the hose upon the rack.

In testimony whereof I affix my signature, in the presence of two witnesses.

CHARLES NUHRING.

Witnesses:
ROBERT NUHRING,
CHARLES BAUER.